B. FISCH.
SLEIGH RUNNER ATTACHMENT FOR VEHICLES.
APPLICATION FILED MAY 17, 1918.
1,337,833.
Patented Apr. 20, 1920.
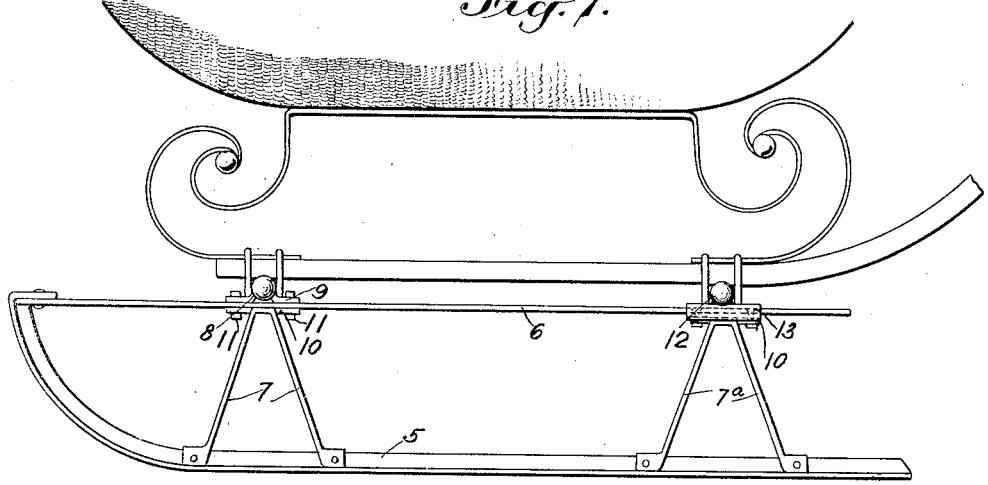
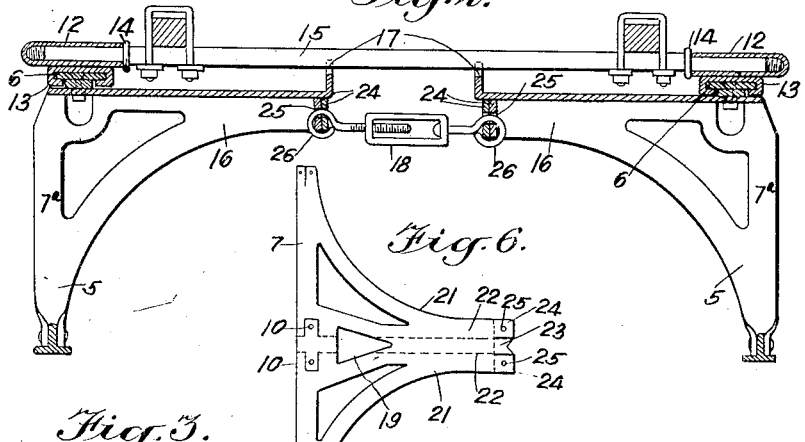
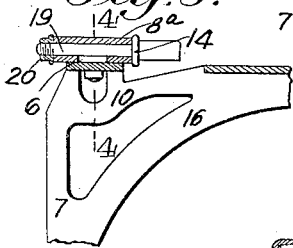
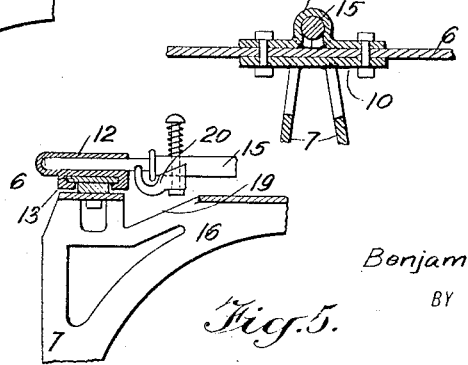
WITNESSES
INVENTOR
Benjamin Fisch
BY
ATTORNEYS

UNITED STATES PATENT OFFICE.

BENJAMIN FISCH, OF BROOKLYN, NEW YORK.

SLEIGH-RUNNER ATTACHMENT FOR VEHICLES.

1,337,833.  Specification of Letters Patent.  Patented Apr. 20, 1920.

Application filed May 17, 1918. Serial No. 235,161.

*To all whom it may concern:*

Be it known that I, BENJAMIN FISCH, a citizen of the United States, and a resident of New York city, borough of Brooklyn, in the county of Kings and State of New York, have invented a new and Improved Sleigh-Runner Attachment for Vehicles, of which the following is a full, clear, and exact description.

My invention has for its object to provide an inexpensive attachment for vehicles and especially baby carriages, having two runners with means by which they may be quickly mounted on the axles of a vehicle and be secured in position relatively thereto.

Additional objects of the invention will appear in the following specification in which the preferred form of my invention is described.

In the drawings similar reference characters refer to similar parts in all the views, in which—

Figure 1 is a side elevation showing how my invention may be attached to a baby carriage.

Fig. 2 is an enlarged transverse sectional view.

Fig. 3 is a fragmentary sectional view illustrating a modified form of the invention.

Fig. 4 is a sectional view on the line 4—4 of Fig. 3.

Fig. 5 is a fragmentary sectional view showing how the attachment may be secured to a well known type of baby carriage.

Fig. 6 is a member stamped from a blank which may be bent to form the legs.

By referring to the drawings, it will be seen that the attachment consists of two runners 5, each having a bar 6 mounted on legs 7 which connect the bars with the bodies of the runners 5. To each of the bars 6 there is secured a sleeve 8 by means of straps 9 and 10 which are fastened to the bars 6 by bolts 11. There are also additional sleeves 12 which are mounted on members 13 which slide on the bar 6 and which are supported on the bodies of the runners by legs 7ª. These legs 7ª are in addition to the legs 7 which have been described. The sleeves 12 are thus slidably mounted so that they may be adjusted relatively to the sleeves 8 and with reference to the distance between the forward and rear axles on the vehicle on which the attachment is to be mounted.

When the wheels of the vehicle have been removed, the runners 5 which are free from each other are disposed one at each side of the vehicle and the sleeves 8 are disposed over the terminals of one of the axles, preferably the forward axle. When this has been done, the members 13 are moved along the bar 6 until the sleeves 12 are in position to be disposed over the other axles of the vehicle. It will be seen that the sleeves 8 and 12 will abut against shoulders 14 on the axles 15 to limit the movement of the sleeves 8 and 12 in the direction of each other.

In addition to the legs 7 and 7ª, the runners 5 have inwardly extending arms 16 with bearings 17 for engaging the under sides of the axles of the vehicle, as best shown in Fig. 2 of the drawings. It will be understood that the sleeves 8 and 12 in conjunction with the arms 16 will give the necessary bearing and prevent the wabbling of the runners relatively to the vehicle, and it will also be understood that when the arms 16 are drawn in the direction of each other by the turn-buckle 18, indicated in Fig. 2 of the drawings, the attachment will be securely held in place, although permitting its convenient removal when desired.

It will be understood by referring to the drawings that the turn buckle 18 consists of the usual two members, one of these turn buckle members being secured to one of the arms 16 and the other turn buckle member being secured to the other arm 16.

In Figs. 3 and 4 of the drawings, I show a modified form of the invention in which the sleeves 8ª do not extend to the end of the axle terminals 19 which permits of the use of nuts 20 which fit the thread on the axle and which serve to hold the sleeves 8ª inwardly and against the axle bead 14 which has been described.

In Fig. 5, the attachment is shown as applied to one form of baby carriage axle, the wheel locking means 20 being disposed at the opening 19 in the arm 16. This opening 19 is formed when the legs 7 or 7ª with their arm 16 are stamped from a blank. The stamped member before its parts are bent is shown in Fig. 6. The sides 21 of the form are bent down along the dotted lines 22 and the tongue 23 is bent upwardly and is forked for engaging the bottom and the sides of the axle as shown at 17. The ears 24 are bent inwardly, one against the other, and have orifices 25 through which the turn buckle members 26 are disposed. The tongues 10 are stamped up from the form and are secured to the bar 6 or to the member 13. The ends of the leg 7 and 7ª are split so that they may straddle the runners 5 and be secured thereto in this position.

It should be understood that I do not limit myself to the precise form of the arrangement shown. Numerous modifications may be made in the construction without departing from the nature of the invention.

Having thus described my invention, I claim as new and desire to secure by Letters Patent:

1. In a sleigh runner attachment for vehicles, two runners having sleeves with heads, for disposal on the axles of a vehicle, the heads normally engaging the ends of the axles to limit the movement of the sleeves in the direction of each other, and a turn-buckle for securing the runners together.

2. In a sleigh runner attachment for vehicles, two runners having sleeves with heads for disposal on the axles of a vehicle, the heads normally engaging the ends of the axles to limit the movement of the sleeves in the direction of each other, inwardly extending arms on the runners for engaging the axles, and a turn-buckle connected with the arms, for the purpose specified.

3. A vehicle having axles, two runners having sleeves for disposal over the ends of the axles, means to limit the movement of the sleeves in the direction of each other, inwardly extending arms on the runners for engaging the axles, and means connecting the arms for drawing the runners in the direction of each other.

4. In a sleigh runner attachment for vehicles, two runners having sleeves for disposal on the axles of a vehicle, arms on the runners for engaging the axles at points spaced from the sleeves, and turnbuckle means to draw the runners in the direction of each other.

5. In a sleigh runner attachment for vehicles, two runners, each having a longitudinal bearing, two sleeves, one secured to each bearing, two additional sleeves, means slidable on the bars to which the additional sleeves are secured, arms on the runners for engaging the axle at points spaced from the sleeves, and means to draw the arms in the direction of each other.

6. In a sleigh runner attachment for vehicles, two runners having sleeves for disposal over the ends of an axle, inwardly extending arms on the runners for engaging the bottom and sides of the axle, the arms being bent above the axle and means connected with the arms for drawing the runners in the direction of each other.

7. A member stamped from a blank having a tongue cut between the sides of one end, the sides being bent down to form legs and reinforcements, the tongue being bent upwardly for engaging with a vehicle axle, the sides of the member at the tongue being bent one against the other and secured, and two tongues cut at the other end of the member to serve as means for attachment to a bar of a sleigh runner.

8. In a sleigh runner attachment for vehicles, a member stamped from a blank having a tongue between the sides of one end, the sides being bent down to form legs and reinforcements therefor, the legs being adapted to be secured to a sleigh runner, the tongues being bent up for engagement with a vehicle axle and the sides of the member at the tongue being bent one against the other and secured together.

9. In a sleigh runner attachment for vehicles, two runners having sleeves for disposal on the axles of a vehicle, the runners being detachable one from the other, means to limit the movement of the sleeves in the direction of each other, inwardly extending arms on the runners for engaging the axles, and a turn-buckle connecting the arms to draw the arms in the direction of each other.

10. In a sleigh runner attachment for vehicles, two runners having sleeves for disposal on the axle of a vehicle, the runners being detachable one from the other, means to limit the movement of the sleeves in the direction of each other, inwardly extending arms on the runners having parts for engaging the axle, and a turn-buckle connecting the arms below their said parts, for the purpose specified.

BENJAMIN FISCH.